July 7, 1959

D. L. KNAUSS 2,894,212

BLOCKING OSCILLATOR

Filed July 28, 1958

INVENTOR.
DALTON L. KNAUSS
BY [signature]
ATTORNEY

United States Patent Office 2,894,212
Patented July 7, 1959

2,894,212

BLOCKING OSCILLATOR

Dalton L. Knauss, Scottsdale, Ariz., assignor to Hoffman Electronics Corporation, a corporation of California Application July 28, 1958, Serial No. 751,322

9 Claims. (Cl. 331—148)

The present invention relates to blocking oscillators and more particularly, to improved bias means for controlling the cut-off of the oscillator.

In the past, several methods have been employed. For example, externally triggered blocking oscillators have used a fixed negative bias voltage from a conventional power supply for maintaining a negative cut-off voltage on the oscillator in the absence of the trigger input signal. Of course, blocking oscillators of the free-running type cannot use fixed bias supplies without also employing complicated networks in order to obtain a pulse train output. Further, free-running blocking oscillators present opposing problems when it is desired to have a slow pulse repetition rate and yet also have a sharp leading edge, since the R-C networks which have a long time constant for the pulse repetition rate also have a long time constant occasioning a slow rise time for the output pulses.

It is an object of the present invention to eliminate the need for a fixed negative bias supply in an externally triggered blocking oscillator.

An additional object of the present invention is the provision of a free-running blocking oscillator having a relatively slow repetition rate and sharp leading and trailing edges in the output pulses.

According to the present invention, a blocking oscillator including a single translating device and a saturable core transformer is provided with a series circuit intercoupling the input and the output of the translating device and comprising a capacitor, a resistor and a semiconductor diode disposed with a particular polarity. A control electrode of the translating device is coupled to the series circuit. In the case of an externally determined pulse repetition rate, a trigger input is also coupled to the control electrode. In both the externally triggered and the free-running cases, the charge time for the capacitor is determined almost solely by the product of the values of the capacitor and the resistor, and that product also determines the initial discharge rate of the capacitor. In the free-running case, the pulse repetition rate will be determined by the values of the capacitor and the reverse resistance of the diode rather than the resistor.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is a schematic diagram of an externally triggered blocking oscillator in accordance with the present invention.

Figure 1:
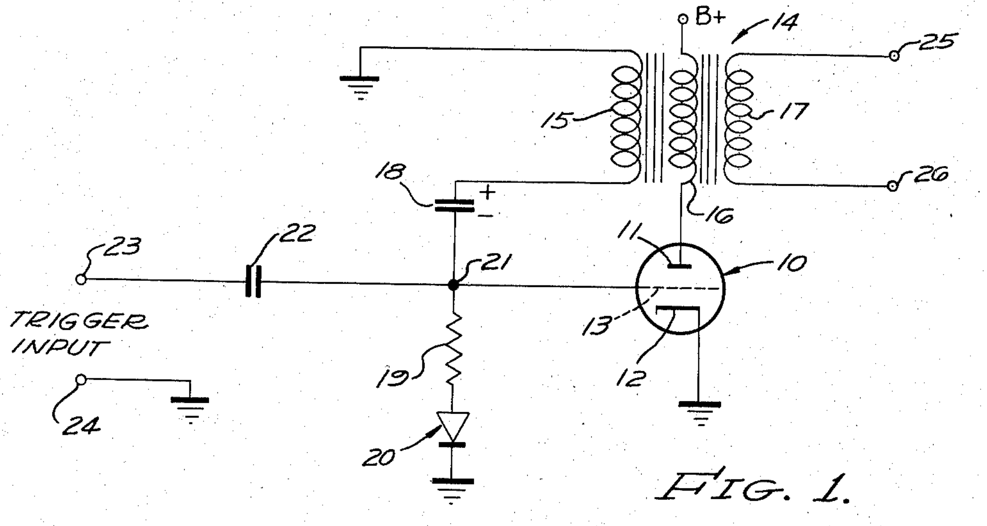

In Figure 1, tube 10 contains anode 11, cathode 12 coupled to ground, and control electrode 13. Saturable core transformer 14 is provided with windings 15, 16 and 17. Anode 11 is coupled through winding 16 to B+. Winding 17 constitutes the output winding. Winding 15 is coupled to ground at one end and series-coupled at the other end to capacitor 18, resistor 19, and semiconductor diode 20 to ground. Control electrode 13 is coupled to the junction 21 of capacitor 18 and resistor 19 and also through coupling capacitor 22 to terminal 23 of the trigger input. Terminal 24 of the trigger input is grounded. The output signal is preferably taken from terminals 25 and 26 of winding 17. Diode 20 is a semiconductor diode, preferably of a silicon junction type having a well defined breakdown characteristic in the reverse direction. The reverse voltage breakdown level of a semiconductor diode, neglecting thermal effects, may be determined by either of two effects or mechanisms called "Zener breakdown" and "avalanche breakdown," respectively. Although the most modern theory favors avalanche breakdown as the recognized mechanism which determines the reverse voltage breakdown level, that level is approximately the same in a given device no matter which theory is applied. Therefore, for historical consistency, the reverse voltage breakdown level will be referred to as the "Zener voltage."

The operation of the circuit of Figure 1 may be described as follows. When the B+ voltage is initially applied to anode 11, tube 10 conducts and anode current flows through winding 16 of transformer 14, thereby inducing a voltage into winding 15 with a polarity such that current is caused to flow through diode 20 (in the forward direction), resistor 19, and capacitor 18. Thus, capacitor 18 will be charged with the polarity shown. The forward resistance of diode 20 is in the order of one ohm and therefore negligible. The voltage developed across resistor 19 applies a positive driving voltage to control electrode 13, causing the anode current to increase until saturation of transformer 14 is reached. Control electrode 13 draws some current which aids in the rapid charging of capacitor 18. Upon the rapid saturation of the core of transformer 14, the voltage induced in winding 15 drops to zero and capacitor 18 starts to discharge through resistor 19 and diode 20 in the reverse direction. Diode 20 is selected to have a Zener voltage somewhat greater than the cut-off voltage of tube 10. The dynamic or "slope" impedance of diode 20 is very low in the Zener region, that is, in the order of a few tens of ohms. Therefore, the voltage across charged capacitor 18 being greater than the Zener voltage initially, capacitor 18 discharges at a rate which is controlled almost solely by resistor 19 until the capacitor voltage equals the Zener voltage of diode 20. Upon commencement of the discharge of capacitor 18 through resistor 19 and diode 20, tube 10 cuts off sharply. When the voltage across capacitor 18 drops down to the Zener voltage level, the reverse resistance or impedance of diode 20 changes from the previously negligible value to a value in the order of a thousand megohms. This high effective resistance slows down the rate of discharge of capacitor 18 very greatly compared to its previous rate of discharge, and allows capacitor 18 to hold tube 10 at cut-off for a relatively long period of time. In the absence of a trigger pulse from the trigger input, tube 10 will be cut off for a period of time determined by the product of the capacitance of capacitor 18 and the reverse resistance below the Zener level of diode 20, which will be discussed more fully in connection with Figure 2 hereafter. In the case of an externally controlled pulse repetition rate, a trigger pulse will be coupled through coupling capacitor 22 to control electrode 13 and will overcome the negative bias supplied by capacitor 18, causing tube 10 to conduct again and the cycle to be repeated. Of course, the external trigger pulse repetition rate should be greater than the natural repetition rate of the blocking oscillator.

Figure 2:
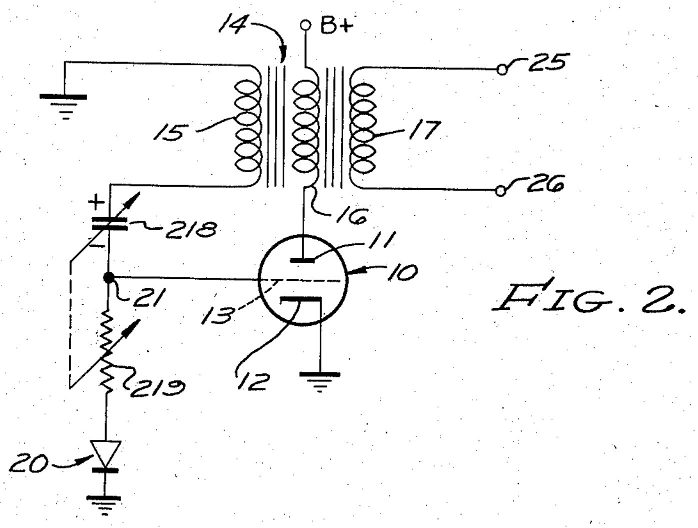
Figure 2 is a schematic diagram of a free-running blocking oscillator in accordance with the present invention.

In Figure 2, components similar to those in Figure 1 have been designated by the same or similar numerals. Capacitor 218 and resistor 219 may be variable, as shown, for the control of various factors. The operation is the same as that of the device illustrated in Figure 1, except that the external pulse repetition rate control is eliminated and the blocking oscillator operates in a free-running manner. The effect of the variation in values of capacitor 218 and resistor 219 may best be understood in connection with Figure 3.

Figure 3:
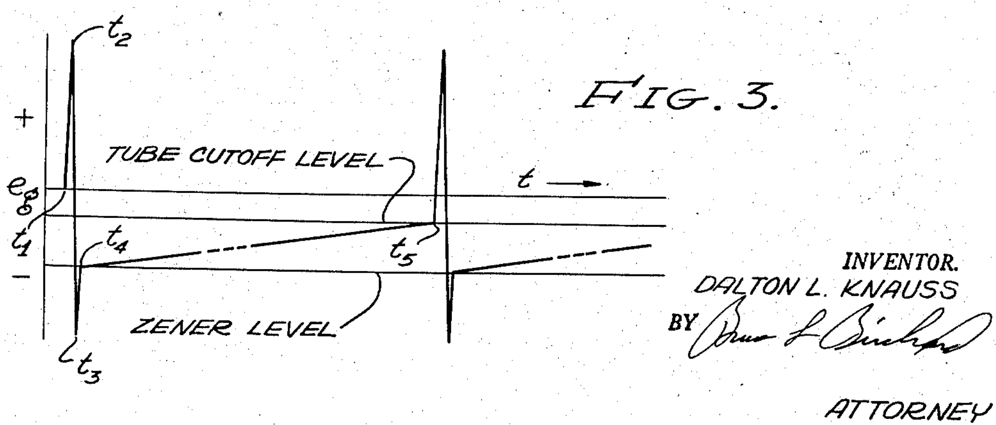
Figure 3 is a diagram showing the waveform obtained in accordance with the present invention.

Figure 3 represents the instantaneous voltages present on control electrode 13 as measured with respect to ground and plotted against time. Assuming the application of the B+ voltage to anode 11 at $t_1$, $e_g$ rises rapidly to the point of transformer core saturation at $t_2$ and then reverses to its most negative value at $t_3$. During the period from $t_3$ to $t_4$, the capacitor 218 is discharging through resistor 219 and diode 20 in its reverse direction. At $t_4$, capacitor 218 has discharged sufficiently so that the Zener level of diode 20 has been reached, and thereafter the discharge through diode 20 decreases greatly due to the reverse resistance of the diode which is in the order of one thousand megohms or more. The curve from $t_4$ to $t_5$ has been broken as an indication of a lack of an appropriate time scale, since the ratio of time $t_4$—$t_5$ to time $t_1$—$t_4$ is easily in the order of 100,000 to 1. At $t_5$, capacitor 218 having discharged to a point where $e_g$ has reached the tube cut-off level, tube 10 begins to conduct again and the cycle is repeated. In the case of a circuit built by applicant, capacitor 218 had a value of .005 microfarad, resistor 219 was 47,000 ohms, diode 20 was a 1N205 having a Zener level of approximately 24 volts, tube 10 was a 6SN7, and B+ was about 425 volts. These values are cited only as examples. Rise time $t_1$—$t_2$ is determined almost solely by the product of the values of capacitor 218 and resistor 219 since the diode is operating through its negligible forward resistance, being in the order of one ohm. Fall time $t_2$—$t_3$ and discharge time $t_3$—$t_4$ are also determined by capacitor 218 and resistor 219 since the reverse resistance of diode 20 is only in the order of 10 ohms until the Zener level is reached. Hence, during the period of $t_1$—$t_4$, variation of either capacitor 218 or resistor 219 will alter the charge and discharge rate of capacitor 218, and diode 20 will have no effect thereon. However, from $t_4$ to $t_5$, the reverse resistance of diode 20 is in the order of 20,000 times as great as the resistance of resistor 219 so that variation of resistor 219 will have almost no effect whatsoever on time $t_4$—$t_5$. Since time $t_4$—$t_5$ is determined almost solely by the product of the capacitance of capacitor 218 and the reverse resistance of diode 20, and the latter cannot be varied, time $t_4$—$t_5$ can only be varied by capacitor 218. Hence, the shape and other characteristics of the curve from $t_1$ to $t_4$ can be changed by varying resistor 219, without affecting the slope of the curve from $t_4$ to $t_5$ and the period of time $t_4$ to $t_5$ can be lengthened or shortened by changing the slope of the curve therebetween through variations of capacitor 218. Since capacitor 218 also affects the portion of the curve between $t_1$ and $t_4$, resistor 219 may be varied in a sense opposite in magnitude to that of capacitor 218 for maintaining the characteristics of the curve between $t_1$ and $t_4$. In most cases, it will only be desired to vary the time between $t_4$ and $t_5$, in which cases the variable controls for capacitor 218 and resistor 219 may be ganged, as shown, for variations in opposite senses for maintenance of a particular time constant during the period $t_1$ to $t_4$. Using component values as previously indicated, the free-running pulse repetition rate was found to be approximately 15 pulses per minute. Thus, the circuit of Figure 2 provides a pulse train having very sharp pulses separated by a relatively long period which may be varied without affecting the sharpness of the pulses.

It should be noted that the output of the oscillator may be taken from junction 21 rather than output terminals 25 and 26. Also, any other translating device may be substituted for vacuum tube 10, such as a transistor.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A blocking oscillator including a translating device having anode, cathode and control electrodes, said cathode electrode being coupled to a common reference potential, a saturable core transformer having at least first and second windings, said first winding intercoupling said anode electrode and a source of potential which is positive with respect to said common reference potential, a capacitor coupled between said control electrode and one end of said second winding, the remote end of said second winding being coupled to said common reference potential, and a series-coupled resistor and semiconductor diode coupled between said control electrode and said common reference potential, said diode being directionally disposed to present its forward resistance to current flow from said common reference potential towards said control electrode and having a voltage breakdown level in the reverse direction that is greater than the current cut-off level for said translating device.

2. A blocking oscillator including a translating device having anode, cathode and control electrodes, said cathode electrode being coupled to a common reference potential, a saturable core transformer having first, second and output windings, said first winding intercoupling said anode electrode and a source of potential which is positive with respect to said common reference potential, a capacitor coupled between said control electrode and one end of said second winding, the remote end of said second winding being coupled to said common reference potential, a series-coupled resistor and semiconductor diode coupled between said control electrode and said common reference potential, said diode being directionally disposed to present its forward resistance to current flow from said common reference potential towards said control electrode and having a voltage breakdown level in the reverse direction that is greater than the current cut-off level for said translating device, and a source of trigger pulses coupled to said control electrode.

3. A blocking oscillator including a translating device having anode, cathode and control electrodes, said cathode electrode being coupled to a common reference potential, a saturable core transformer having first, second and output windings, said first winding intercoupling said anode electrode and a source of potential which is positive with respect to said common reference potential, a capacitor coupled between said control electrode and one end of said second winding, the remote end of said second winding being coupled to said common reference potential, and a series-coupled resistor and semiconductor diode coupled between said control electrode and said common reference potential, said diode being directionally disposed to present its forward resistance to current flow from said common reference potential towards said control electrode and having a voltage breakdown level in the reverse direction that is greater than the current cut-off level for said translating device.

4. A blocking oscillator including a translating device having anode, cathode and control electrodes, said cathode electrode being coupled to a common reference potential, a saturable core transformer having first, second and output windings, said first winding intercoupling said anode electrode and a source of potential which is positive with respect to said common reference potential, a capacitor coupled between said control electrode and one end of said second winding, the remote end of said second winding being coupled to said common reference potential, a series-coupled resistor and semiconductor diode coupled between said control electrode and said common reference potential, said diode being directionally disposed to present its forward resistance to current flow from said common reference potential towards said control electrode and having a voltage breakdown level in the reverse direction that is greater than the current cut-off level for said translating device, said diode having a reverse resistance below said breakdown level greatly in excess of the resistance of said resistor, and a source of trigger pulses coupled to said control electrode.

5. A blocking oscillator including a translating device having anode, cathode and control electrodes, said cathode electrode being coupled to a common reference potential, a saturable core transformer having at least first and second windings, said first winding intercoupling said anode electrode and a source of potential which is positive with respect to said common reference potential, a capacitor coupled between said control electrode and one end of said second winding, the remote end of said second winding being coupled to said common reference potential, and a series-coupled resistor and semiconductor diode coupled between said control electrode and said common reference potential, said diode being directionally disposed to present its forward resistance to current flow from said common reference potential towards said control electrode and having a voltage breakdown level in the reverse direction that is greater than the current cut-off level for said translating device, said diode having a reverse resistance below said breakdown level greatly in excess of the resistance of said resistor.

6. A device in accordance with claim 5 wherein said capacitor is variable for varying the time constant of said capacitor and resistor and also varying the time constant of said capacitor and said diode reverse resistance.

7. A device in accordance with claim 6 wherein said resistor is variable for varying the time constant of said capacitor and resistor.

8. A device in accordance with claim 5 wherein said resistor is variable for varying the time constant of said capacitor and resistor.

9. A device in accordance with claim 7 further including ganged variation means for varying said capacitor and said resistor in opposite senses to maintain a fixed time constant thereof while varying the time constant of said capacitor and said diode reverse resistance.

No references cited.